(12) United States Patent
Guo et al.

(10) Patent No.: US 8,571,003 B2
(45) Date of Patent: Oct. 29, 2013

(54) TIMESLOT SHARING PROTOCOL FOR WIRELESS COMMUNICATION NETWORKS

(75) Inventors: Jianlin Guo, Malden, MA (US);
Chunjie Duan, Medfield, MA (US);
Ghulam M. Bhatti, Mansfield, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 959 days.

(21) Appl. No.: 12/193,911

(22) Filed: Aug. 19, 2008

(65) Prior Publication Data
US 2009/0213816 A1    Aug. 27, 2009

Related U.S. Application Data

(60) Provisional application No. 61/030,281, filed on Feb. 21, 2008.

(51) Int. Cl.
*H04B 7/212* (2006.01)
*H04J 3/00* (2006.01)
*H04J 3/17* (2006.01)

(52) U.S. Cl.
USPC ........... 370/347; 370/345; 370/348; 370/443; 370/498; 370/336

(58) Field of Classification Search
USPC .................................. 370/336, 347
See application file for complete search history.

(56) References Cited

U.S. PATENT DOCUMENTS

| | | | |
|---|---|---|---|
| 2002/0105970 A1* | 8/2002 | Shvodian | 370/468 |
| 2003/0137993 A1* | 7/2003 | Odman | 370/468 |
| 2006/0092909 A1 | 5/2006 | Ho | |
| 2008/0259895 A1* | 10/2008 | Habetha et al. | 370/345 |

FOREIGN PATENT DOCUMENTS

| | | |
|---|---|---|
| EP | 1199848 | 4/2002 |
| WO | 03/030459 | 4/2003 |
| WO | 2005/076544 | 8/2005 |

OTHER PUBLICATIONS

Jianlin Guo et al.: "Efficient Medium Access Protocol for Wireless Sensor Networks" Sensor Technologies and Applications, 2008 Sensorcomm '08. Second International Conference on, IEEE, Piscataway, NJ USA, Aug. 25, 2008, pp. 13-17.

* cited by examiner

*Primary Examiner* — Noel Beharry
(74) *Attorney, Agent, or Firm* — Dirk Brinkman; Gene Vinokur

(57) ABSTRACT

A method for transmitting information in a communication network of multiple nodes, in which information transmission is partitioned into successive superframes, and in which each superframe is partitioned into a beacon period followed by a data period, which may consist of a contention free period (CFP), and each beacon period and CFP of the data period is partitioned into timeslots. The method includes allocating to at least a first node of the multiple nodes a designated timeslot in which to transmit data in at least one of a plurality of superframes, and allocating to at least a second node of the multiple nodes the same designated timeslot in which to transmit information during at least one subsequent superframe.

8 Claims, 9 Drawing Sheets

TIMESLOT SHARING PROTOCOL FOR WIRELESS COMMUNICATION NETWORKS

RELATED APPLICATION

This U.S. Patent Application claims benefit of priority to U.S. Provisional Application 61/030,281, "Timeslot Sharing Protocol for Wireless Communication Networks," filed 21 Feb. 2008 by Guo et al, and incorporated herein by reference.

FIELD OF THE INVENTION

This invention relates generally to communication networks, and more particularly to wireless networks using a shared communication media and timeslot based scheduling protocols.

BACKGROUND OF THE INVENTION

In wireless communication networks, efficient utilization of the media is important for low and high data rates. For low data rate networks, such as sensor networks, efficient transmission scheduling decreases power consumption and cost. For high data rate networks, such as audio-video (AV) networks, efficient transmission scheduling increases data throughput and improves quality of service (QoS).

Because signals transmitted by all transceivers, commonly called nodes, share the same frequency channel, it is necessary to enforce a channel access protocol to efficiently utilize the available network bandwidth. This can be done with a channel access schedule, which determines when and how nodes can access the shared channel.

For synchronization and network management, communication networks can partition time into periodic time intervals, when superframes are transmitted. A superframe can be further partitioned into a beacon period, a data transmission period, and in some cases, an idle period. Generally, the duration of the superframe is designed to guarantee satisfactory network synchronization, and to minimize transmission latency.

Data Transmission

The data transmission period can be partitioned into a contention-free period (CFP), and a contention-access period (CAP). During the CFP, a node first reserves or is allocated a timeslot to transmit data. During the CAP, nodes use some contention technique, such as carrier sense-multi access/collision detection (CSMA/CD) to transmit data.

Beacon Period

During the beacon period, network parameters are transmitted, i.e., transmission rates, logical channels, network identifiers, and the channel access schedule. The beacon period also defines the start of the CFP, the start of the CAP, and in some cases, the access schedule for the CFP. The beacon period can also include other parameters as defined by an applicable standard.

In general, for both the beacon period and the CFP, time is further partitioned into allocatable timeslots. In the case of the beacon period, the timeslot is referred as a beacon period slot. In the case of CFP, the timeslot is referred to as a guaranteed timeslot (GTS) or reserved timeslot. The CAP can also include timeslots, which are not allocated to any particular node. The number of timeslots in the beacon period, CFP and CAP can vary.

During a conventional timeslot for the beacon period or the CFP, only the node that has been allocated to the timeslot is allowed to transmit data. Even if the duration of the transmission is only a fraction of the timeslot or the node does not transmit in every superframe, all other nodes are not allowed to use the same timeslot in any superframe. Therefore, the length of the timeslot is an important design consideration in conventional networks. If the timeslot is too short, then overhead can increase. If the timeslot is too long, then throughput can be reduced.

All nodes in the network are allowed to access timeslots in the CAP by using the contention access mechanisms defined for the network. However, each timeslot in the beacon and the CFP is allocated to one specific node, and all other nodes are not allowed to access the network during that time in any superframe.

With a fixed length of the timeslots, the total numbers of slots for the beacon period and CFP are limited. For example, the IEEE 802.15.3 standard (WiMedia) specifies a maximum of forty-eight beacon period slots. The IEEE 802.15.4 standard (ZigBee) specifies a maximum of seven GTS in each superframe. Both of these standards promote interoperability of networks on a worldwide basis.

Such conventional timeslot allocation schemes impose the following limitations on the wireless network. The allocated timeslot is not fully utilized when the node has nothing to transmit. The total number of nodes that have access during the beacon period or CFP is limited by the number of timeslots. The conventional timeslot allocation scheme also has implications on power consumption, as in many networks nodes are required to transmit their own beacon, and 'listen' to other beacons in the channel in every superframe.

SUMMARY OF THE INVENTION

According to one aspect of the present invention, a method is provided for transmitting information in a communication network of multiple nodes, in which time is partitioned into successive superframes. The method includes allocating to at least a first node of the multiple nodes a designated timeslot in which to transmit information in at least one of a plurality of superframes, and allocating to at least a second node of the multiple nodes the same designated timeslot in which to transmit information during a different subsequent superframe.

According to another aspect of the present invention, a system is provided for transmitting information in a communication network of nodes, in which information is transmitted between multiple nodes in subsequent superframes. The system includes at least a first node of the multiple nodes configured to transmit data in a designated timeslot allocated to the first node in at least one of a plurality of superframes, and at least a second node of the multiple nodes configured to transmit data in the same designated timeslot during at least one different superframe.

According to another aspect of the present invention, a method and system is provided where the designated timeslot is in a beacon period of a superframe.

According to another aspect of the present invention, a method and system is provided where the designated timeslot is in a contention free period of a superframe.

According to another aspect of the present invention, a method and system is provided where a coordinator node is configured to allocate timeslots in subsequent superframes to respective nodes of the multiple nodes.

According to another aspect of the present invention, a method and system is provided, where the coordinator node is configured to allocate timeslots in subsequent superframes to respective nodes according to a transmission periodicity of the respective nodes in the designated timeslot in subsequent superframes.

According to another aspect of the present invention, a method and system is provided, where the multiple nodes are configured to scan successive superframes to locate a superframe to transmit within.

According to another aspect of the present invention, a method and system is provided, where a first node is configured to allocate the designated timeslot to itself. The first node is further configured to broadcast a sharability status of the designated timeslot. A second node is configured to transmit a request to share the designated timeslot in a subsequent superframe after the first node broadcasts the sharability status of the designated timeslot.

Thus, according to the present invention there is provided a periodic and shared timeslot allocation method and system which guarantees that only one node transmits data during any particular timeslot of any given superframe, but which enables a set of multiple nodes to participate in the same timeslot in subsequent superframes. The present invention further provides a method to allocate sharable timeslots, locate the sharable timeslots and broadcast (propagate) information about the sharable timeslots throughout the network.

Accordingly, the present invention provides a method and system to allocate sharable timeslots for the beacon period and the contention free period.

Accordingly, the present invention provides a method and system to dynamically modify the characteristics of the sharable timeslots and reschedule new sharable timeslots.

Further, the present invention provides a method and system in which nodes share timeslots in beacon periods and/or contention free periods.

Thereby, the present invention improves network utilization efficiency and data throughput, increase the maximum number of nodes allowed to participate in communications, and reduce power consumption in the network.

DETAILED DESCRIPTION OF THE PREFERRED EMBODIMENTS

Wireless Network of Nodes

Figure 1:
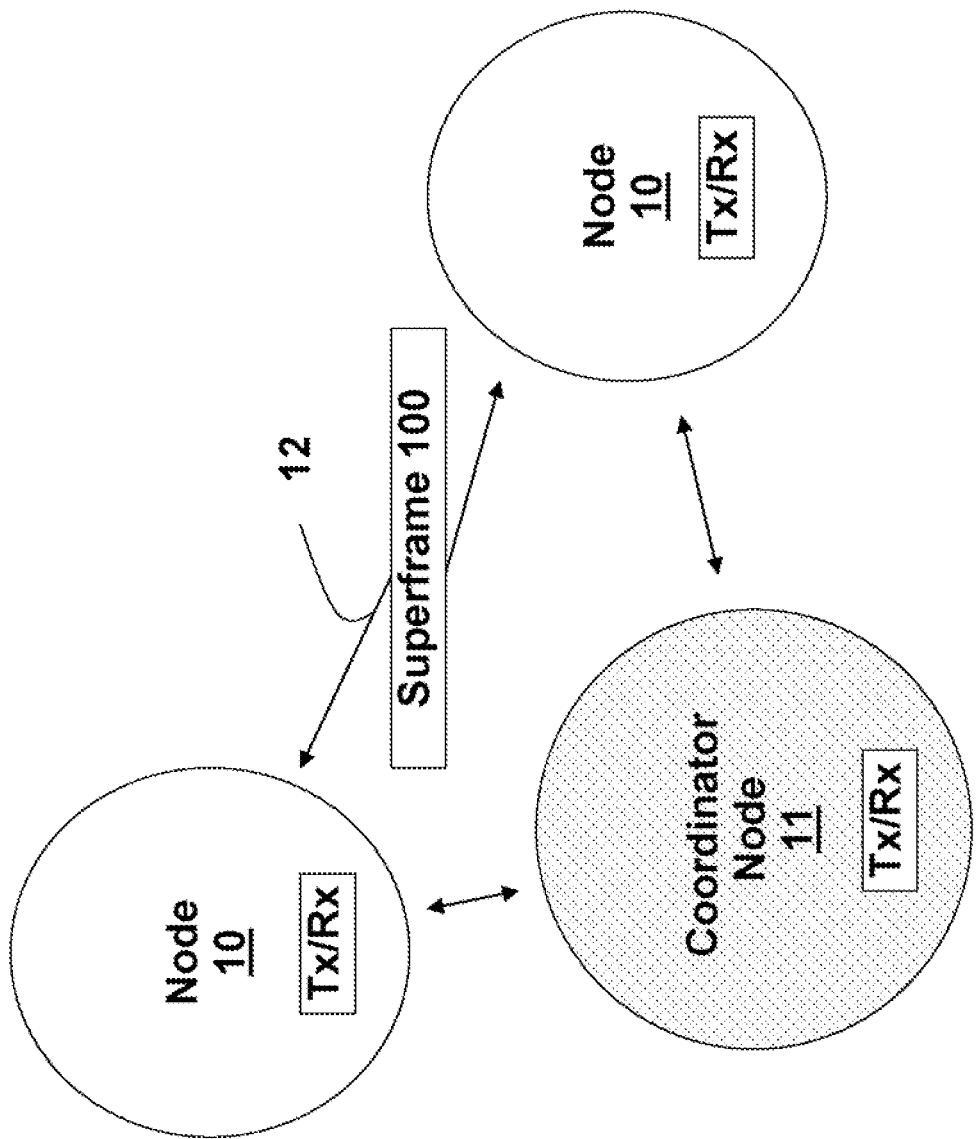
FIG. 1 is a schematic of a wireless network of nodes according to an embodiment of the invention.

FIG. 1 shows a wireless network according to an embodiment of the invention. The network includes transceivers (nodes) 10-11, and each node includes a transmitter (Tx) and a receiver (Rx), which form a transceiver. The nodes communicate data 12 with each other during superframes 100 using a shared media, i.e., a common wireless channel.

In an example of a controlled or managed network, one of the nodes 11 can be designated as a coordinator node. Although not required, the coordinator node can manage network synchronization and resource allocation, such as the timeslot according to the embodiment of the invention described below. In general, the network management can be ad hoc, distributed, or central.

A node can be designated as the coordinator on the following basis: a node is arbitrarily chosen; the node is the first to join (or start) a network; a node designated as a backup coordinator becomes the designator in the event the original coordinator leaves the network; the node has special hardware or software.

There is no coordinator in purely distributed networks. In a coordinated or managed networks, coordinator may or may not have different hardware or software. As examples, in an 802.11 network (WiFi), an Access Point has special hardware and software and acts as a coordinator. In an 802.15.4 network, only full functional node can be a coordinator.

Superframes

Figure 2:
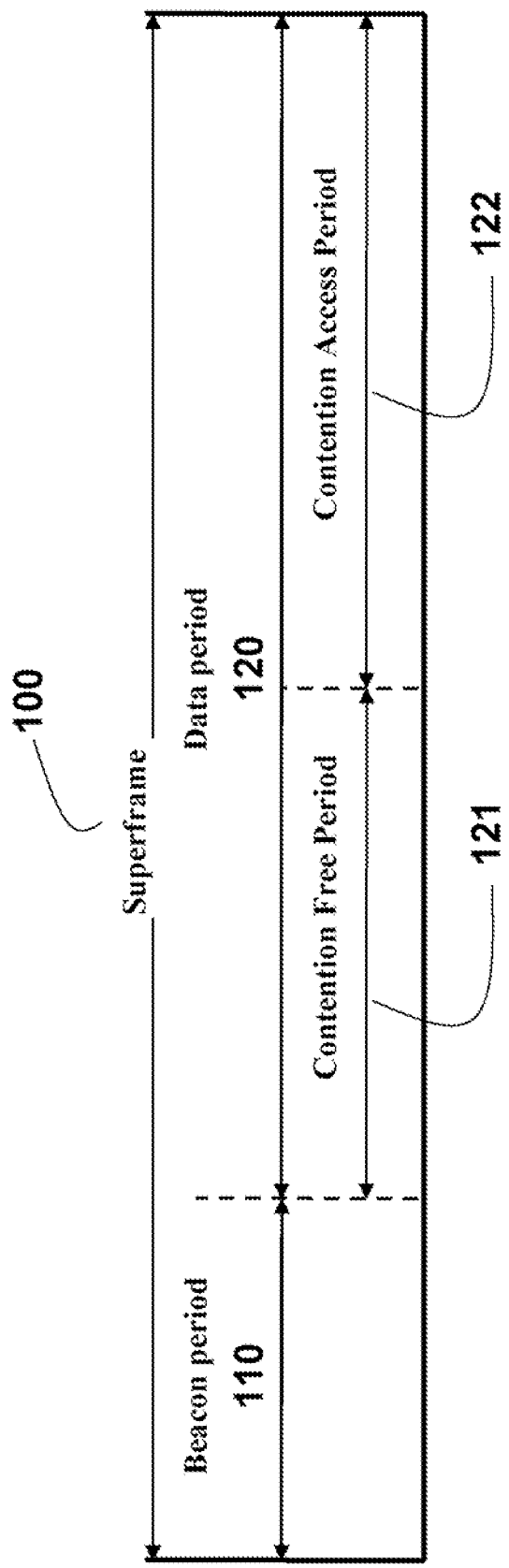
FIG. 2 is a block diagram of a structure of a superframe according to an embodiment of the invention.

FIG. 2 shows the superframe 100 according to an embodiment of the invention in greater detail. The superframe includes a beacon period 110 and a data period 120. The data period includes a contention free period (CFP) 121, and a contention access period (CAP) 122. The specific structure of the superframe is network dependent.

Figures 3A, 3B, 3C:
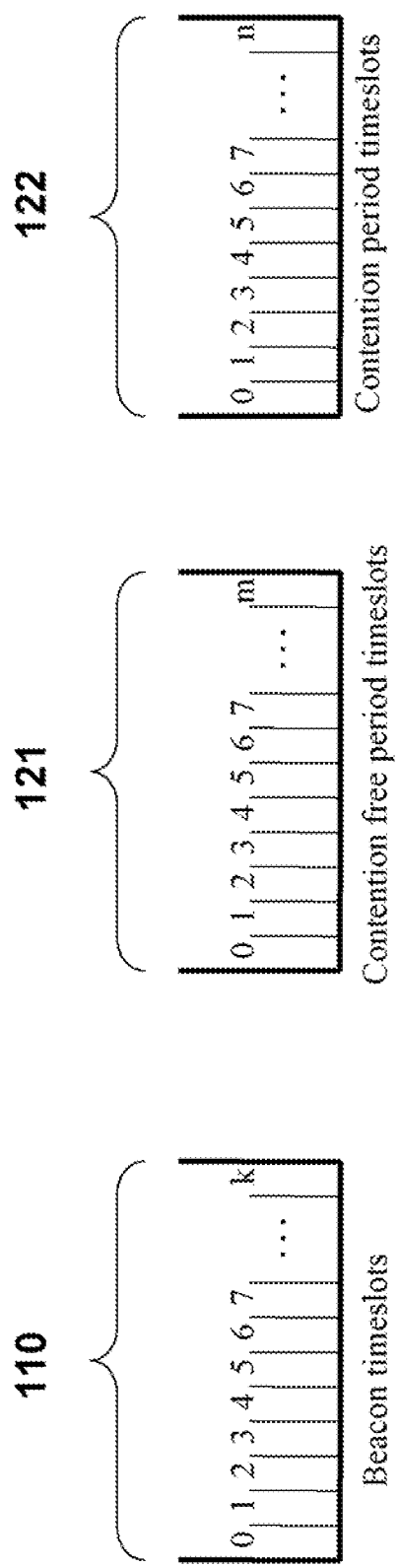
FIGS. 3A-3C are block diagrams showing timeslot partitioning for the superframe of FIG. 2.

FIGS. 3A-3C show periodic timeslots for the beacon period, CFP and CAP periods, respectively. The number of timeslots, k, m, and n can vary in each of the periods.

In distributed networks or ad hoc networks according to the embodiments of the invention, nodes periodically transmit beacons. The beacons provide synchronization and network management information, which are propagated (or broadcasted) through the network. Each node can be allocated a particular timeslot in the beacon period to transmit its beacon.

Figure 4:
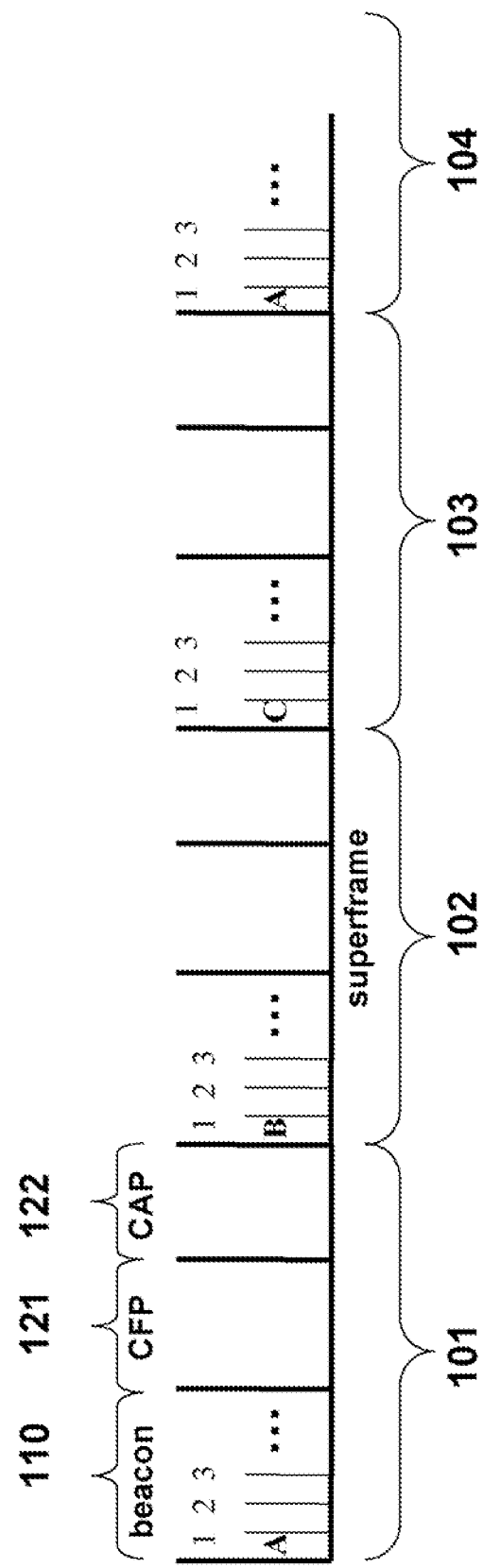
FIG. 4 is a timing diagram of periodic timeslot allocation according to an embodiment of the invention.

As shown in FIG. 4, if a node (A, B, or C) does not need to transmit the beacon in a particular timeslot of every superframe, then the same timeslot can be shared periodically with other nodes that similarly transmit periodically. This periodic timeslot sharing reduces the total number of beacon slots needed, and hence reduces the length of the beacon period 110. This sharing of timeslots also increases the length of data transmission period 120, and consequently improves network efficiency. The patterns available for the sharing of the timeslot are not limited to the pattern shown in FIG. 4 where a pattern of periodicity of three is shown as ABC, etc. The pattern may also be ACB, A-C, or ABB as examples, where "-" indicates the slot is unoccupied. In other words, the pattern may be specified parametrically or procedurally.

Figure 5A:
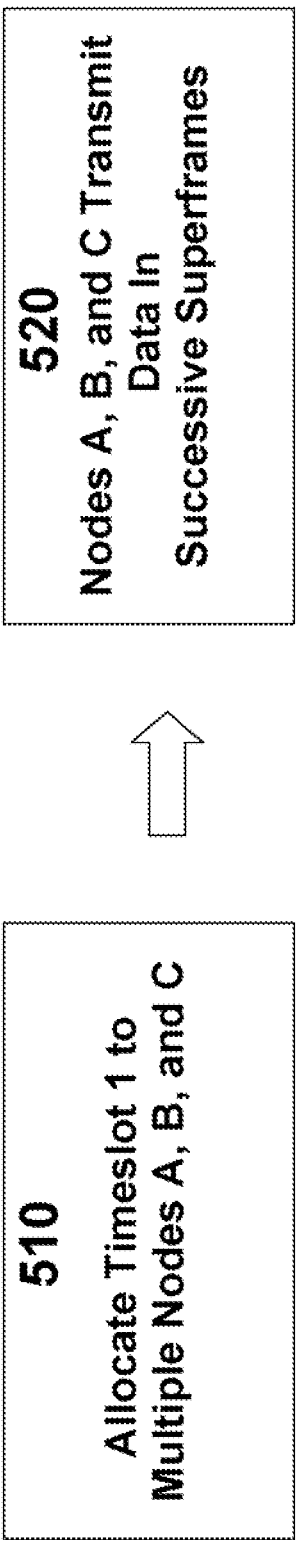
FIGS. 5A-5B show a respective flow diagram and illustration of a method for transmitting data according to an embodiment of the invention.
Figure 5B:
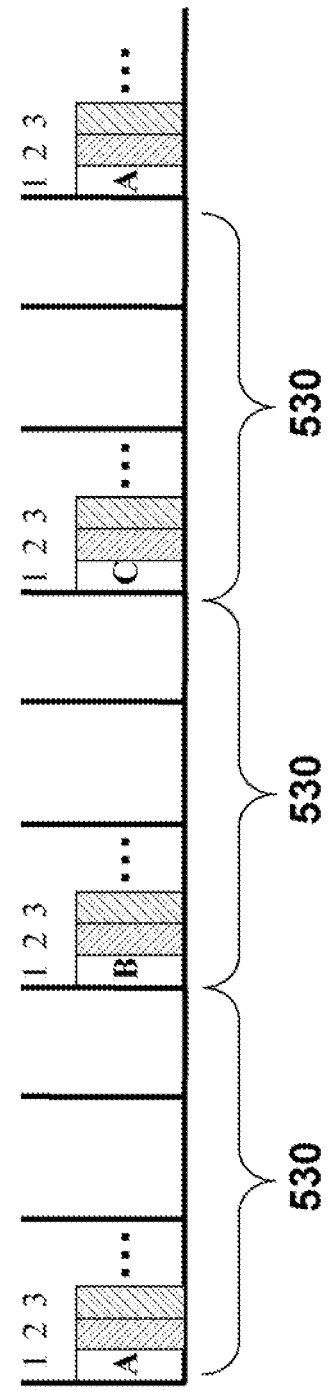

Therefore, according to the process shown in FIGS. 5A and 5B, in step 510 a single timeslot 1 is allocated to a set of multiple nodes A, B, and C, and in step 520 each node transmits data periodically in subsequent superframes 530 according to the periodicity of the allocated timeslots such that during any one superframe only one of the nodes in the set of multiple nodes transmits. Subsequent is defined herein as following at some later time.

Timeslot sharing in the Beacon Period

In the example shown in FIG. 4, the first timeslot in the beacon period 110 in the first superframe 101 is allocated to node A, to node B in the second superframe 102, to node B in the third superframe 103, and then in the fourth frame, to node A again. Here, the periodicity of the timeslot sharing is three. Other regular or irregular periodicities can also be used.

Distributed Mode

Figure 6:
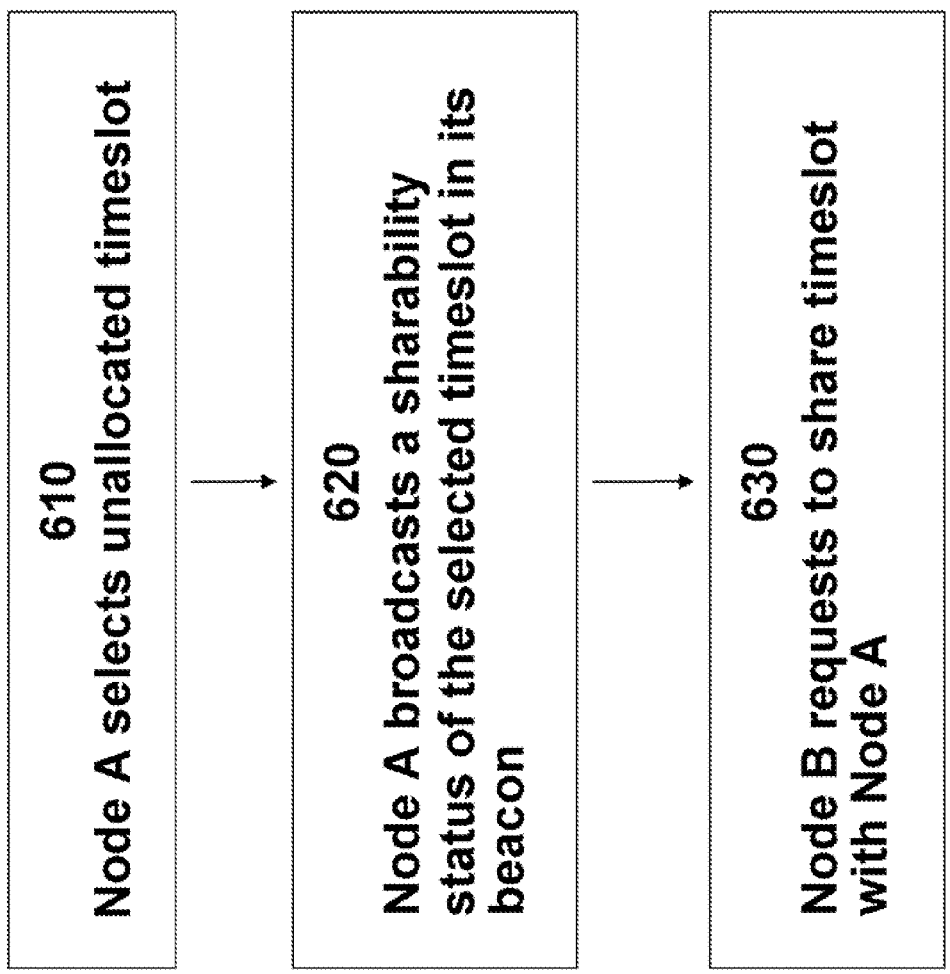
FIG. 6 is a flow diagram for time sharing in a beacon period in a distributed mode according to an embodiment of the invention.

In one embodiment of a distributed network without a coordinator node, as shown in FIG. 6, a particular node A selects an unallocated timeslot in step 610, and broadcasts a sharability status of the selected timeslot in its beacon in step 620. In step 630, other nodes, such as Node B, can then request to join this node to share its timeslot. The decision to join or not can depend on the periodicity that node A transmits in its beacon.

Figure 7A:
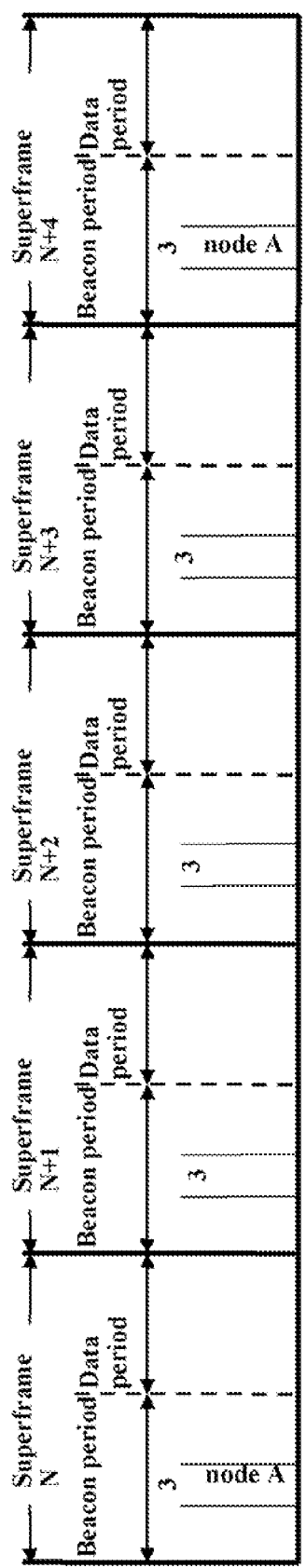
FIGS. 7A-7B are timing diagrams for periodic timeslots for a beacon period according to embodiments of the invention.
Figure 7B:
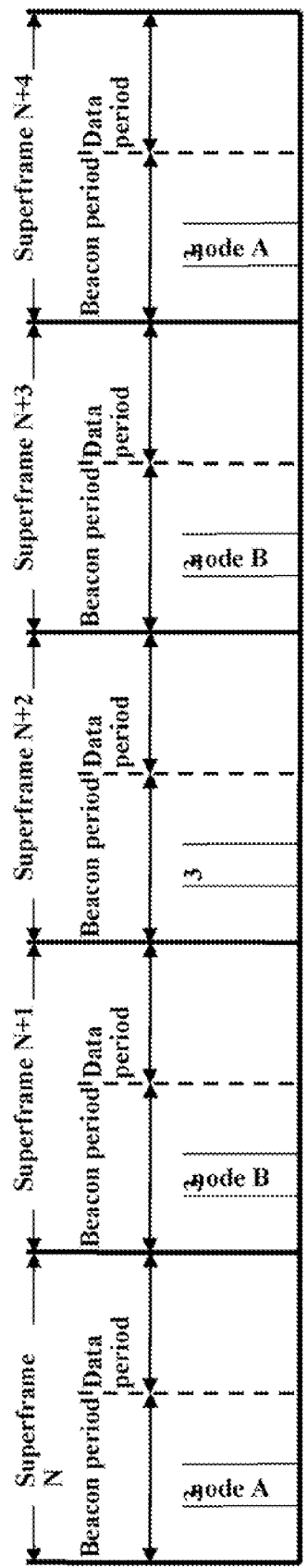

For example, FIG. 7A shows a protocol where node A transmits its beacon every four superframes. The node A is assigned to beacon timeslot 3. Node B can request to share timeslot 3 with node A in superframes in which node A does not transmit a beacon. In this particular example, node B transmits every other superframe, as shown in FIG. 7B, in superframes in which Node A is not transmitting.

The timeslot sharing information is propagated (broadcast) in the network so that no beacon collisions are caused. The term propagate is used to indicate that all nodes may not be in range of the broadcasting node, and the information may need to be relayed via intermediate nodes. A node can change its beacon transmission periodicity and timeslot at any time and re-select or join a desirable timeslot to transmit its beacon.

When a node first tries to join a desirable timeslot in the distributed mode, collisions are avoided generally by the node first trying to scan timeslots before the node attempts to have the timeslot allocated for its use. However, in some situations where nodes are simultaneously trying to be allocated a timeslot, the allocation of the timeslot is subject to contention techniques similar to those used in the contention access period, such as carrier sense-multi access/collision detect (CSMA/CD)

The timeslot for a node can also change over time to reduce the length of the beacon period, as long as a desirable timeslot is available. An exact allocation and sharing of timeslots is implementation specific, and independent of the invention. As an example, if initially, a node is transmitting in the $K^{th}$ slot at the transmission frequency of once every two superframes. If an earlier slot, the $L^{th}$ slot, becomes available to nodes with this transmission frequency, the node which initially transmits in the $K^{th}$ slot can relinquish the $K^{th}$ slot and request to join the $L^{th}$ slot.

Coordinator Node

Figure 8:
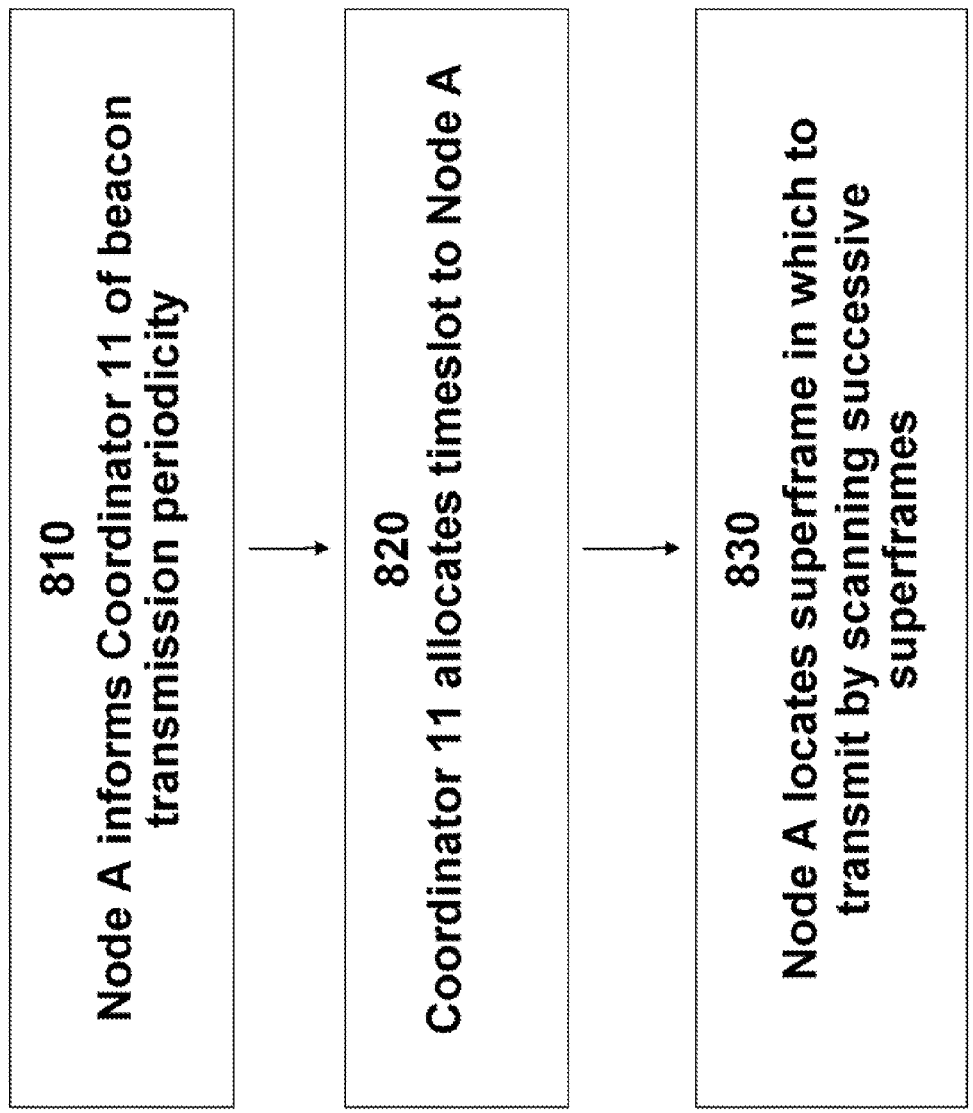
FIG. 8 is a flow diagram for time sharing in a beacon period in a coordinated network.

In a controlled or managed network with a coordinator node, in the process shown in FIG. 8, node A informs the network coordinator 11 of its beacon transmission periodicity during a process of joining the network in step 810. The network coordinator can then assign a node beacon transmission periodicity by negotiation with the node. In step 820 network coordinator 11 allocates a timeslot to the node A based on the desired transmission periodicity for the beacon of the requesting node. The allocated timeslot can be sharable as long as the periodic transmission of the beacon for the requesting node is guaranteed.

The network coordinator can maintain a record of the beacon transmission periodicity and timeslot number allocation for all nodes in a memory. A node can request the network coordinator to change its beacon transmission periodicity and timeslot allocation at any time. The network coordinator can also change the allocation timeslots to adapt the length of the beacon period to maximize network efficiency.

If a node declares or is allocated a sharable timeslot satisfying its beacon transmission periodicity, then in step 930 the node A can locate its superframe for beacon transmission by scanning a sufficient number of successive superframes to determine when it transmits.

For example, if a node A transmits its beacon every four superframes as shown in FIG. 7A, the node A scans beacons for at least four successive superframes. If the sharable timeslot is identified as occupied in four successive superframes, then this sharable timeslot is not available. If a sharable timeslot is identified as unallocated in one or more superframes, then the node A can take its turn and transmit its beacon in an unoccupied timeslot of a superframe.

Timeslot Sharing in the Contention Free Period

The timeslots in the contention free period are allocated to or reserved by a set of multiple nodes, typically to transmit streaming data, such as in audio-visual (AV) and sensor networks. Similar to the timeslots in the beacon period, the timeslots in the CFP can also be shared by sets of nodes if the set of nodes to which the timeslot is assigned or the set that initially allocated the timeslot does not transmit data in every superframe. The timeslot sharing according to the embodiment of the invention increases data throughput and efficiency of the network.

In the distributed network without a coordinator node, an initial set of nodes that first reserves an unoccupied timeslot broadcasts (propagates) the sharability of its allocated timeslot, and its data transmission pattern. The nodes with a set of nodes can manage themselves in a distributed manner as described above. Other nodes can join this set to share its timeslot if this timeslot satisfies their data transmission needs. The establishment of an initial set of nodes, or the priority given to a node within a set of nodes may be accomplished with a "decree" or by design as was discussed above in regards to selecting a coordinator node.

Figure 9:
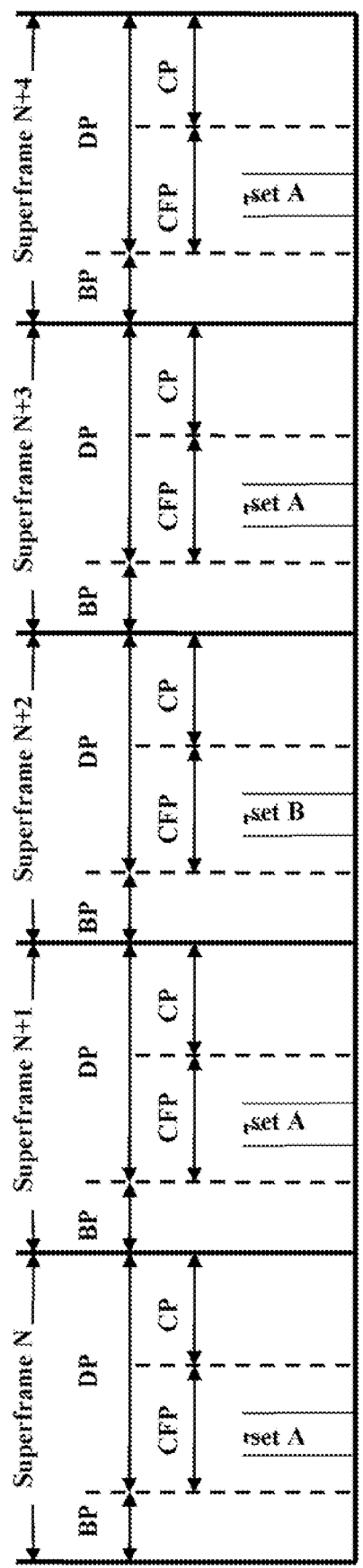
FIG. 9 is a timing diagram for period timeslots for a contention free period according to embodiments of the invention.

FIG. 9 shows timeslot sharing for the CFP according to an embodiment of the invention. For example, if a set A of nodes announces that it transmits data during two of every three superframes, then a set B of nodes that transmits data in every one of every three superframes can join the set A to share the timeslot of set A. The timeslot sharing information is propagated in the network so that no data collision is caused.

In a request/response based controlled or managed network, a node transmits its data transmission information and data destination information to the network coordinator 11 during the process of requesting a CFP timeslot. The network coordinator allocates the timeslots to the requesting node based on the data transmission information. The allocated timeslots can be shared with other nodes, as long as the requesting node's data transmission is guaranteed.

In the controlled or managed network, the network coordinator can dynamically request each node to report its data transmission information and allocated sharable timeslots as long as there is no transmission collision.

In the controlled or managed network, the network coordinator informs nodes of timeslot sharing information. The coordinating node also can record in a memory each node's timeslot assignment in the CFP and the nodes allocated to each timeslot. Any node as well as the network coordinator can initiate a timeslot allocation change at any time based on node requirements or network conditions.

To transmit data in a sharable timeslot, the node determines its turn for data transmission. A node should listen for data transmission in the channel for a sufficient successive number of superframes to determine its turn. For example, if a node wants to transmit data every three superframes, then the node listens for data transmission for at least three successive superframes. If there is data transmission in the timeslot in each successive superframe, then this timeslot is not available. If the timeslot is idle in one or more superframes, then the node can take its turn and transmit data.

A node can change its data transmission information (schedule) at any time and reserve a desirable timeslot to transmit its data in the distributed network, or report its new data transmission information to the network coordinator to request new timeslot assignment in the controlled or managed network.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transmitting information in a communication network of multiple nodes, in which time is partitioned into successive superframes, comprising:

allocating by a first node of the multiple nodes a designated timeslot in which to transmit information in at least one of a plurality of superframes;

broadcasting, by the first node, a sharability status of the designated timeslot;

allocating by a second node of the multiple nodes the same designated timeslot as the first node in which to transmit information during a subsequent superframe, wherein the designation time slot is shared between first node and the second node within a current reservation before the current reservation is terminated, and wherein the sharing is periodic before the successive superframes so that only one of the nodes transmits during the designated timeslot during any particular superframe; and transmitting, by the second node, an annoncement to share the same designated timeslot, wherein the communication network is decentralized.

2. The method of claim 1, wherein the first and second allocating steps comprise:

allocating the same designated timeslot in a beacon period of plural superframes.

3. The method of claim 1, wherein the first and second allocating steps comprise:

allocating the same designated timeslot in the contention free period of plural superframes, in which each superframe includes a data period that includes a contention free period.

4. A system for transmitting information in a decentralized communication network of nodes, in which information is transmitted between multiple nodes in successive superframes, the system comprising:

at least a first node of the multiple nodes configured to transmit data in a designated timeslot allocated by the first node in at least one of a plurality of superframes, wherein the first node is configured to broadcast a sharability status of the designated timeslot; and at least a second node of the multiple nodes configured to transmit data in the same designated timeslot as the first node during at least one different superframe, wherein the designated time slot is shared between first node and the second node within a current reservation before the current reservation is terminated wherein the second node is configured to transmit a request to share the designated timeslot in a subsequent superframe after the first node broadcasts the sharability status of the designated timeslot, and wherein the sharing is periodic over successive superframes so that only one of the nodes transmits during the designated timeslot during any particular superframe; and transmitting, by the second node, an announcement to share the same designated timeslot, wherein the communication network is decentralized.

5. The system of claim 4, wherein the designated timeslot is in a beacon period of the at least one of the plurality of superframes.

6. The system of claim 4, wherein the designated timeslot is in a contention free period of the at least one of the plurality of superframes.

7. The system of claim 4, wherein the multiple nodes are configured to scan successive superframes to locate a superframe to transmit within.

8. The system of claim 6, wherein a first node is configured to allocate the designated timeslot to the first node.

* * * * *